United States Patent Office 3,451,964
Patented June 24, 1969

3,451,964
SINGLE PACKAGE ROOM TEMPERATURE VULCANIZING SILICONE ELASTOMER COMPOSITIONS
Charles E. Creamer, North Tonawanda, N.Y., assignor to Union Carbide Corporation, a corporation of New York
No Drawing. Filed Feb. 24, 1966, Ser. No. 529,665
Int. Cl. C08g 47/04, 47/10
U.S. Cl. 260—37          20 Claims

ABSTRACT OF THE DISCLOSURE

A room temperature curable aminosilicon composition comprising an anhydrous mixture of (A) an aminosiloxane having an average of about two silicon-bonded amino end-blocking groups and (B) an organosilicon compound having at least three silicon-bonded amino end-blocking groups which (1) in the absence of an acid catalyst but in the presence of water at room temperature will form a silicone gum and which (2) in the presence of an acid catalyst and water at room temperature cures to a silicone elastomer, alternatively, said silicone gum may be stably formed first and then room temperature cured in the presence of an acid catalyst and water to a silicone elastomer.

---

This invention relates to novel organopolysiloxane gum compositions, to processes for preparing said organopolysiloxane gum compositions; to room temperature vulcanizable compositions containing said organopolysiloxane gums; and to the elastomers prepared from said room temperature vulcanizable compositions.

Silicone elastomers based on diorganopolysiloxane polymers are well-known products and are presently enjoying an expanding market in the field of elastomers, due in part to the unusual physical properties which are obtained with these materials, physical properties which are not readily obtainable with other types of elastomers. To date two general methods have been employed for vulcanizing silicone elastomers. The older method involves the incorporation of a curing agent into a composition containing a polysiloxane gum and, if desired, other additional ingredients, and then activating the curing agent through the application of heat. Although this method is widely used in making preformed or molded silicone rubber products, it is inconvenient or impractical to use this method of cure in many instances where the elastomer is to be employed as a sealant, an adhesive, a caulking material and the like.

In the second method which has more recently been developed, the elastomers are cured at room temperature through the interaction of the various ingredients. During the early stages of development of this second method for preparing organopolysiloxane elastomers, it was necessary to keep one or more of the components separate from the remaining components of the curable mixture until the mixture was to be curred. This required a two-package system for preparing this type of elastomer, and it also required immediate processing and use of the gumstock after all of the ingredients of the composition had been mixed. Since the processing time (the time between the mixing of all of the various ingredients and the elastic solidification of the product—the only time during which the mass remained plastic and workable) is generally quite short for most room temperature vulcanizable (hereinafter RTV) silicone rubber stocks, any unused stock is usually lost; and any stock partially worked may also be lost, because it becomes difficult or impossible to further work the stock after vulcanization has taken place. Although there have been several attempts to prolong the processing time, such as cooling the reactive mixture and/or using solvents to dilute the reactive components, these attempts have proven to be impractical for general use. In many applications cooling cannot be achieved without the expenditure of a great deal of time, effort or expense, and the use of solvents results in excessive shrinkage during cure. Thus, when two component systems are employed, exact planning for the processing circumstances and the quantity of material to be used in each instance is necessary, or the resulting expense of using RTV silicone rubber stocks will be unduly high, due to the resultant waste of material. The further disadvantages of the two package system of having to package, ship and store the RTV composition in at least two separate containers; and of having to mix the various ingredients just before use are apparent. The two-package system also makes it most difficult to use small quantities of RTV silicone rubber stocks.

Several recent developments in the art of RTV elastomers have led to the development of single package RTV systems which can be packed, shipped and stored in a single container. The prime advantages of the single package systems are that they do not require the preliminary mixing of the several components just prior to use, they have indefinitely long storage life and they are immediately ready for use by simple application and exposure to the normal atmosphere in order to obtain a cure. However, all of the presently available single package systems contain as a major component a relatively high molecular weight organopolysiloxane base polymer, which necessarily results in an RTV silicone rubber composition having a relatively high viscosity prior to being cured. In many applications wherein the resulting elastomer is intended to serve as a caulk, a sealant or an adhesive in confined and/or minute areas, the relatively high initial viscosity of the RTV composition prevents or makes difficult the intimate contact necessary in order to provide a satisfactory seal.

It is an object of this invention to provide novel RTV compositions which are curable to organopolysiloxane elastomers.

It is a further object of this invention to provide organopolysiloxane elastomers which are particularly suitable for use as caulking materials, adhesives and sealants.

Other objects of this invention are disclosed in or will be apparent from this disclosure, including the appended claims.

This invention provides a process for obtaining essentially linear, high molecular weight organopolysiloxane gums suitable for RTV use which comprises reacting (a) a major amount of an organopolysiloxamine having the formula:

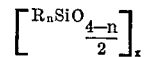

wherein R is an unsubtituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $n$ has an average value of from about 1.8 to about 2.2, and $x$ has an average value greater than 2, said organopolysiloxamine having an average of about two silicon-bonded amino end-blocking groups represented by the formula:

wherein R¹ is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, R² is hydrogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, or R¹ and R² together are a divalent hydrocarbon radical which forms a heterocyclic ring with the nitrogen atom to which said divalent hydrocarbon radical is attached; (b) a minor amount of an organosilicon compound having at least one silicon atom and at least three of the silicon-bonded amino end-blocking groups being defined above, each silicon atom present in said organosilicon compound being bonded to at least one of said silicon-bonded amino end-blocking groups, or to at least one other silicon atom through oxygen, the remaining valences of any silicon atoms present which are not satisfied by said silicon-bonded amino end-blocking groups, or oxygen to silicon bonds being satisfied by an unsubstituted monovalent hydrocarbon radical, a substituted monovalent hydrocarbon radical wherin the substituents are selected from the class consisting of halogens, cyano groups, alkoxy groups, aryloxy groups, amino groups, carbalkoxy groups and nitro groups, or a polyvalent hydrocarbon radical having each remaining free valence satisfied by a silicon atom which has its three remaining valences satisfied by unsubstituted monovalent hydrocarbon radicals, substituted monovalent hydrocarbon radicals wherein the substituents are selected from the class consisting of halogens, cyano groups, alkoxy groups, aryloxy groups, amino groups, carbalkoxy groups and nitro groups, silicon-bonded amino end-blocking groups as defined above, or oxygen to silicon bonds; and (c) a minor amount of water. The organopolysiloxane gums prepared according to this process usually range in molecular weight from about 300,000 to about 5,000,000.

This invention also provides RTV compositions which comprises an acid catalyst and either (1) an organosilicon compound having at least one silicon atom and at least three of the silicon-bonded amino end-blocking groups defined above, each silicon atom present in said organosilicon compound being bonded to at least one of said silicon-bonded amino end-blocking groups, or to at least one other silicon atom through oxygen, the remaining valences of any silicon atoms present which are not satisfied by said silicon-bonded amino end-blocking groups, or oxygen to silicon bonds being satisfied by an unsubstituted hydrocarbon radical, a substituted hydrocarbon radical wherein the substituents are selected from the class consisting of halogens, cyano groups, alkoxy groups, aryloxy groups, amino groups, carbalkoxy groups and nitro groups, or a polyvalent hydrocarbon radical having each remaining free valence satisfied by a silicon atom which has its three remaining valences satisfied by unsubstituted monovalent hydrocarbon radicals, substituted monovalent hydrocarbon radicals wherein the substituents are selected from the class consisting of halogens, cyano groups, alkoxy groups, aryloxy groups, amino groups, carbalkoxy groups and nitro groups, silicon-bonded amino end-blocking groups as defined above, or oxygen to silicon bonds and an organopolysiloxamine having the formula:

$$\left[ R_nSiO_{\frac{4-n}{2}} \right]_x$$

wherein R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $n$ has an average value of from about 1.8 to about 2.2, and $x$ has an average value greater than 2, said organo- polysiloxamine having an average of about two silicon-bonded amino end-blocking groups represented by the formula:

wherein R¹ is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, R² is hydrogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, or R¹ and R² together are a divalent hydrocarbon radical which forms a heterocyclic ring with the nitrogen atom to which said divalent hydrocarbon radical is attached; or (2) an essentially linear high molecular weight organopolysiloxane gum reaction product of said organopolysiloxamine and said organosilicon compound.

This invention also provides organopolysiloxane elastomers which may be obtained by exposing of the above-mentioned RTV compositions to water, such as moisture in air.

The organopolysiloxamines which are useful in preparing the high molecular weight organopolysiloxane gums and RTV compositions of the invention are compounds having the general formula:

$$\left[ R_nSiO_{\frac{4-n}{2}} \right]_x$$

wherein R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $n$ has an average value of from about 1.8 to about 2.2, and $x$ has an average value greater than 2, said organopolysiloxamine having an average of about two silicon-bonded amino end-blocking groups represented by the formula:

wherein R¹ is an unsubstituted monovalent hydrocarbon radical or a substituted monovalent hydrocarbon radical wherein the substituents are selected from the class consisting of halogens, cyano groups, alkoxy groups, aryloxy groups, amino groups, carbaloxy groups and nitro groups, R² is hydrogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, or R¹ and R² together are a divalent hydrocarbon radical which forms a heterocyclic ring with the nitrogen atom to which said divalent hydrocarbon radical is attached. Organopolysiloxamines wherein $x$ has a value of from about 50 to about 200 are particularly preferred.

The above-mentioned organopolysiloxamines are essentially linear compounds, and may contain small amounts of low molecular weight cyclic siloxanes as impurities from the process used in preparing said organopolysiloxamines. Since these cyclic compounds have no organofunctional end-blocking groups present therein, the presence of small amounts of low molecular weight cyclic siloxane impurities has little effect, if any, on the properties and reactivity of the organopolysiloxamines, and they merely act as diluent. The organopolysiloxamines themselves may contain varying proportions of organosiloxane units having the general formulae:

and

within the scope of the general formula for the organopolysiloxamines which is set forth above, and the organic groups attached to each silicon atom may be the same or different. These organopolysiloxamines are fluid polymers ranging in viscosity at 25° C. of from about 3 centipoises to about 300,000 centipoises, preferably from about 5 centipoises to about 50,000 centipoises, and may consist of a single polymer or mixtures of two or more polymers. Minor amounts of end-blocking groups other than

groups may also be present in these organopolysiloxamines, end-blocking groups such as halogens, alkoxy groups, aryloxy groups, acycloxy groups and the like.

Illustrative of the types of monovalent hydrocarbon groups and substituted monovalent hydrocarbon groups represented by R, $R^1$ and $R^2$ in the above-mentioned formulae are alkyl groups, such as methyl, ethyl, propyl, n-butyl, t-butyl, n-octyl, n-octadecyl, and the like; aryl groups, such as phenyl, 1-naphthyl, and the like; cycloalkyl groups, such as cyclobutyl, cyclohexyl, and the like; alkaryl groups, such as p-tolyl and the like; aralkyl groups, such as benzyl, 2-phenylethyl and the like; olefinically unsaturated hydrocarbon groups, such as vinyl, allyl, 3-butenyl, 3-cyclohexenyl, ethynyl, propynyl, 3-vinylphenyl, and the like; substituted alkyl groups such as 3-chloropropyl, 2-cyanoethyl, 3-cyanopropyl, 3-methoxypropyl, 2-ethoxyethyl, 3-aminopropyl, 4-(dimethylamino)butyl, 3-carbethoxypropyl, 3,3,3-trifluoropropyl and the like; substituted aryl groups such as p-phenoxyphenyl, 3-bromophenyl, 3,5-dibromophenyl, 3-nitrophenyl, 4-fluorophenyl, 4-cyanophenyl and the like; and substituted alkaryl groups, such as 3-trifluoromethylphenyl, 3-(dimethylaminomethyl)phenyl, and the like.

As hereinbefore indicated, $R^1$ and $R^2$ taken together can represent a divalent hydrocarbon radical which forms a heterocyclic ring with the nitrogen atom to which it is attached. For example, when $R^1$ and $R^2$ taken together represent a divalent hydrocarbon radical the group

may represent such groups as morpholino radicals, piperidino radicals, pyrrolidino radicals and the like. Organopolysiloxamines wherein R is primarily an alkyl group, such as methyl or ethyl and wherein $R^1$ and $R^2$ are also alkyl groups such as methyl groups are preferred.

The above-mentioned organopolysiloxamines may be conveniently prepared in several ways, one of which involves equilibrating mixtures of organohalosilanes with organosiloxanes in the presence of an acidic catalyst to form halogen end-blocked organopolysiloxanes, subsequently reacting the halogen end-blocked organopolysiloxanes with primary or secondary amines, or mixtures thereof, in the presence of an acid acceptor, separating the acid acceptor-hydrogen halide salt by-product, and recovering the organopolysiloxamine. The resulting organopolysiloxamine can itself be hydrolyzed and condensed to form higher molecular weight polymers which may also be used in the practice of this invention. For example, the lower molecular weight organopolysiloxamines (i.e., those having a viscosity of about 5 centistokes) may readily be converted to essentially linear, higher molecular weight gums merely by exposing these lower molecular weight compositions to moist air.

The polyfunctional organosilicon compounds which are useful in preparing the organopolysiloxane gums and RTV compositions of this invention are any organosilicon compounds which have at least one silicon atom and at least three of the silicon-bonded amino end-locking groups defined above, each silicon atom present in said organosilicon compound being bonded to at least one of said silicon-bonded amino end-blocking groups, or to at least one other silicon atom through oxygen, the remaining valences of any silicon atoms present which are not satisfied by said silicon-bonded amino end-blocking groups, or oxygen to silicon bonds being satisfied by an unsubstituted monovalent hydrocarbon radical, a substituted monovalent hydrocarbon radical wherein the substituents are selected from the class consisting of halogens, cyano groups, alkoxy groups, aryloxy groups, amino groups, carbalkoxy groups and nitro groups, or a polyvalent hydrocarbon radical having each remaining free valence satisfied by a silicon atom which has its three remaining valences satisfied by unsubstituted monovalent hydrocarbon radicals, substituted monovalent hydrocarbon radicals wherein the substituents are selected from the class consisting of halogens, cyano groups, alkoxy groups, aryloxy groups, amino groups, carbalkoxy groups and nitro groups, silicon-bonded amino end-blocking groups as defined above, or oxygen to silicon bonds. The term "polyfunctional organosilicon compound" as such herein is meant to include those compounds immediately defined above (i.e., those which contain three or more of the silicon-bonded end-blocking groups hereinbefore defined), but is not meant to include the aminosiloxy end-blocked organopolysiloxamines which were previously defined and which have an average of about 2 silicon-bonded amino end-blocking groups per molecule. These polyfunctional organosilicon compounds include organosilylamines having the general formula:

wherein $R^1$ is an unsubstituted monovalent hydrocarbon radical or a substituted monovalent hydrocarbon radical wherein the substituents are selected from the class consisting of halogens, cyano groups and alkoxy groups, aryloxy groups, amino groups, carbalkoxy groups and nitro groups, $R^2$ is hyrdogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, or $R^1$ and $R^2$ together are a divalent hydrocarbon radical which forms a heterocyclic ring with the nitrogen at to which said divalent hydrocarbon radical is attached, $a$ is 0 or 1, and X is a monovalent hydrocarbon radical, a substituted monovalent hydrocarbon radical wherein the substituents are selected from the class consisting of halogens, cyano groups, alkoxy groups, aryloxy groups, amino groups, carbalkoxy groups and nitro groups, or a group having the formula:

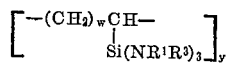

wherein $w$ is an integer having a value of from 1 to about 10, $y$ is an integer having a value of from 1 to about 1,000 and $R^1$ and $R^2$ are as hereinbefore defined, or a group having the formula:

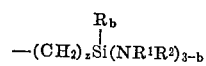

R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^1$ and $R^2$ are as hereinbefore defined, $z$ is an integer having a value of from 1 to 50 and $b$ is 0, 1 or 2; and homopolymeric and copolymeric condensation products of said organosilylamines which contain at least three silicon-bonded end-blocking groups represented by the formula

wherein $R^1$ and $R^2$ are as hereinbefore defined. Homopolymeric derivatives of the above-mentioned organosilylamines which are useful in the practice of this invention are aminosiloxanes containing at least three of the required amino end-blocking groups and consisting essentially of units having the general formula:

$$Z_p Si(NR^1R^2)_q O_{\frac{4-(p+q)}{2}} \quad (I)$$

wherein $R^1$ and $R^2$ are as hereinbefore defined, $p$ is 0, 1, 2 or 3, $q$ is 0, 1, 2 or 3, the sum of $p+q$ is never greater than 3, and Z is a group selected from the class consisting of R, $$-(CH_2)_x CH- \\ \quad | \\ \quad Si(NR^1R^2)_{3y}$$

or $$\begin{array}{c} R_c \\ | \\ -(CH_2)_x Si(NR^1R^2)_d O_{\frac{3-(c+d)}{2}} \end{array}$$

wherein R, $R^1$, $R^2$, $x$ and $y$ are as hereinbefore defined, $c$ is 0, 1, 2 or 3, $d$ is 0, 1, 2 or 3 and the sum of $c+d$ is never greater than 3.

Copolymeric derivatives of the above-mentioned organosilylamines which are useful in the practice of this invention are aminosiloxanes containing at least three of the required amino end-blocking groups and consisting essentially of units having the general Formula I above and units of the general formula:

$$R_e SiO_{\frac{4-e}{2}}$$

wherein R is as hereinbefore defined, and $e$ is 0, 1, 2, or 3.

The above-mentioned organosilylamines may be conveniently prepared in several ways, one of which involves reacting organohalosilanes with primary or secondary amines, or mixtures thereof, together with acid acceptors, separating the acid acceptor-hydrogen halide salt by-products and recovering the organosilylamine. The resulting organosilylamine may then be reacted with limited amounts of water and upon removal of the evolved amine, a homopolymeric aminopolysiloxane which is also useful in the practice of this invention can be obtained; or the organosilylamine can be reacted with other functional silanes or siloxanes in the presence of water, to obtain copolymeric aminopolysiloxanes which are also useful in the practice of this invention upon removal of the by-product of reaction between the amino group and the functional group present in the functional silane or siloxane. Organosilylamines and the homopolymeric and copolymeric derivatives of said organosilylamines wherein R is primarily an alkyl group, such as methyl or ethyl and wherein $R^1$ and $R^2$ are also alkyl groups, such as methyl, are preferred. Illustrative of the types of polyfunctional organosilylamines and aminosiloxanes which may be employed in the practice of this invention are compounds such as $$CH_3Si[N(CH_3)_2]_3; \quad ([(CH_3)_2N]_2Si(CH_3))_2O$$

and $$[(CH_3)_2N]_3SiCH_2CH_2Si[N(CH_3)_2]_3$$

The polyfunctional organosilicon compounds are preferably employed in amounts ranging from about 0.01 part by weight to about 20 parts by weight per 100 parts by weight of organosiloxamine. From 0.10 part by weight to about 5 parts by weight per 100 parts by weight of organosiloxamine are particularly preferred.

The acid catalysts which are useful in preparing the RTV compositions of this invention are any of the Bronsted-Lowry acids, Lewis acids or compounds of these acids which decompose or dissociate to generate such acids in active form. These types of acids include Bronsted-Lowry protonic acids exhibiting $pK_a$ values of less than 8, aprotic Lewis acids, and compounds which readily generate these acids. Illustrative of the types of acids which can be used as catalysts in the practice of this invention are the mineral acids, such as the hydrohalogen acids (e.g., hydrochloric acid, hydrobromic acid, hydroiodic acid, and the like), the oxyhalogen acids (e.g., iodic acid, chloric acid, perchloric acid, and the like), the oxy acids of sulfur (e.g., sulfurous acid, sulfuric acid, chloro-sulfonic acid, persulfuric acid, and the like), oxy acids of phosphorus, (e.g., orthophosphoric acid orthophosphorus acid, hypophosphorous acid and the like) complex acids (e.g., natural acid clays, synthetic aluminas, synthetic alumino silicates), and Lewis acids (e.g., the chloride, bromides and iodides of aluminum, boron, iron and zinc); organic acids such as the carboxylic acids (e.g., formic acid, acetic acid, cyanoacetic acid, chloroacetic acid, dichloroacetic acid, trichloroacetic acid, bromoacetic acid, trifluoroacetic acid, propionic acid, hexanoic acid, bromohexanoic acid, benzoic acid, thiobenzoic acid, oxalic acid, maleic acid, succinic acid, adipic acid, phthalic acid, citric acid, tartaric acid, acrylic acid, polyacrylic acid and the like) the sulfonic and sulfinic acids (e.g., benzene sulfonic acid, toluene sulfonic acid, benzene sulfinic acid, polystyrene sulfonic acid, and the like) and the phosphonic acids (e.g., phenyl phosphonic acid, and the like); and acid generators such as anhydrides (e.g., sulfur dioxide, sulfur trioxide, phthalic anhydride, maleic anhydride, and the like), acyl halides (e.g., acetyl bromide, benzoyl chloride, carbon oxychloride, sulfuric oxychloride, thionyl chloride, thionyl bromide, phosphorous oxychloride, selenium oxychloride and the like) halides of sulfur and phosphorous (e.g., sulfur dichloride, phosphorous trichloride, phosphorous tribromide, phosphorous pentachloride, and the like), titanium acylates and halides (e.g., titanium tetrachloride, titanium tetrabromide, diacetoxytitanate, and the like) silicon acylates and halides (e.g., silicon tetrachloride, hydrogen trichlorosilane, methyltrichlorosilane, diphenyldichlorosilane, dimethyldiacetoxysilane, phenyltriacetoxysilane and the like) ammonium and amine salts of protonic acids (e.g., ammonium sulfate, ammonium chloride, dimethylammoniumacetate, ethylmethylammonium caproate, dimethylammonium, trichloroacetate, praseodymium ammonium benzoate, dimethyl ammonium chloride, and the like) and tertiary amine salts of Lewis acids (e.g., trimethylaminoboronfluoride, dipyridine zinc chloride, and the like).

The acid catalyst is preferably employed in amounts ranging from about 0.001 part by weight to about 5.0 parts by weight per 100 parts by weight of the organopolysiloxamine. From about 0.01 part by weight to about 2.0 parts by weight of catalyst per 100 parts by weight of polysiloxamine are particularly preferred.

The amount of water employed in preparing both the organopolysiloxane gums and the elastomers of this invention is not narrowly critical, as is evidenced by the fact that both gum formation and elastomer formation occurs upon exposure of the various compositions of this invention to moist air, for example, air having a relative humidity of fifty percent at 72° F. Exposure to drier air would merely extend the period of time necessary in order to obtain a gum or a fully cured elastomer, whereas exposure to moister air would shorter the time required to obtain a gum or cured elastomer.

In addition to the above mentioned components, the RTV compositions of this invention may also contain additional components such as filler materials, coloring agents, plasticizers, softeners, odorants, thermal stabilizers, bonding additives, antioxidants, and the like. The fillers which may be employed in preparing the improved organopolysiloxane formulations and elastomers of this invention include the highly-reinforcing carbon black and the inorganic compounds heretofore employed as fillers in organopolysiloxane elastomers in accordance with customary procedures, and they also include finely divided, polymeric organic materials such as polyethylene, polypropylene, polystyrene, polyvinylfluoride, polytetrafluoroethylene, polyhexamethylene adipamide, polymethylene phenol, and the like. These filler materials can be employed either alone or in any suitable combination. If desired, the fillers can be treated with modifying agents, such as the hydrolyzable hydrocarbon silanes or siloxanes, to improve their surface characteristics.

When inorganic fillers are employed in preparing the improved formulations and elastomers of this invention, it is preferably that such fillers be finely-divided, silica-base materials having a particular diameter of less than 500 millimicrons and a surface area of greater than 50 square meters per gram. However, inorganic fillers materials having a composition, or particle diameter and surface area, other than those preferred can also be employed, either alone or in combination with the preferred fillers. Thus, such filler materials as titania, iron oxide, aluminum oxide, aluminum silicate, zinc oxide, zirconium silicate, diatomaceous earth, and quartz can be employed either alone or in combination with the finely-divided, silica-base fillers described above.

The amount of highly-reinforced silica employed as filler in preparing the improved formulations and elastomers of this invention depends upon the tensile strength and hardness properties desired in the elastomer. By way of illustration, where high tensile strength and high hardness properties are required, large amounts of highly-reinforcing silica are employed, together with small amounts of other type fillers, if such be desired. Where high tensile strength and high hardness properties are not as important, for example, when the elastomers are to be employed as coatings or cable compounds, lesser amounts of highly-reinforcing silica can be employed together with larger amounts of other types of fillers.

The compositions of this invention are prepared by mechanically mixing together the various components which are to be included in the desired composition. The particular design of the mixing equipment and the method and order of the various components is not critical, although there are some preferred conditions under which the mixing of the various components should be conducted. For example, since the compositions are reactive in the presence of water, it is essential that the mixing of the various components is conducted under anhydrous or nearly anhydrous conditions. Hence, enclosing the mixing equipment so that the ambient atmosphere can be controlled is preferred. Also, since the compositions of this invention which do not contain an acid catalyst are mildly basic in nature, it is desirable to exclude or control their contact with any acidic or potentially acidic environmental components such as $SO_2$, $CO_2$ or HCl which may be found in the atmosphere. In some cases it may be desirable to add during the preparation of the compositions of this invention very small, controlled amounts of water in order to adjust the viscosity of the resulting composition. It also may be desirable to dry or dehydrate any additional components which are to be added. Such as filler materials which often contain adsorbed moisture, prior to the incorporation of these components into the compositions of this invention; or these additional components might be incorporated into the compositions of this invention after the other components have been admixed.

As hereinbefore indicated, the compositions of this invention behave in either of two different ways upon exposure to water, such as moisture in the air, depending on the presence or absence of an acid catalyst. In the case of those compositions which contain only an organopolysiloxamine and a polyfunctional organosilicon compound of the type hereinbefore described, and no acid catalyst, the compositions undergoes a reaction to form an essentially linear, soluble, high molecular weight organopolysiloxane gum. In the case of those compositions which contain either the above-mentioned organopolysiloxane gum reaction product and an acid catalyst; or an organopolysiloxamine, a polyfunctional organosilicon compound of the type hereinbefore described and an acid catalyst, the composition undergoes a reaction to form an insoluble elastomer. Although the reactions involved in each instance are not known for certain and are difficult to ascertain, it appears that in the first instance (i.e., the reaction involving only the organopolysiloxamine and the polyfunctional organosilicon compound to form a high molecular weight gum), the polyfunctional organosilicon compound merely acts as a chain extender by reacting with the terminal amino-siloxy units which are present in the organopolysiloxamine. Since the resulting high molecular weight organopolysiloxane gum remains soluble in solvents such as hexane, it would appear that surprisingly little or no cross-linking has occurred. In prior art systems which employ linear polymers end-blocked with other types of functional groups, either no gum formation occurs upon exposure to moisture at ambient temperature in the absence of a catalyst, or gum formation occurs very slowly over a prolonged period of time, such as several weeks. In the second instance (i.e. the reaction involving either the high molecular weight organopolysiloxane gum product and the acid catalyst, or the organopolysiloxamine, the polyfunctional organosilicon compound and the acid catalyst) it appears that the acid catalyst catalyzes a cross-linking reaction between (a) either the residual amino-siloxy groups present in the organopolysiloxane gum or the aminosiloxy groups of the organopolysiloxamine, and (b) the amino groups of the polyfunctional organosilicon compound, whereas one might expect the amino compounds to neutralize or form a salt with the acid present.

The RTV compositions of this invention are useful in the same areas as conventional silicone rubber RTV compositions (e.g., as sealants, caulks, coatings and adhesives), and they are also useful in preparing casting molds, replicas and dental impressions.

The following examples are illustrative of this invention. The terms and expressions employed in the examples and throughout this specification are to be interpreted as indicated in the Glossary immediately preceding the examples.

GLOSSARY (A) Hardness (ASTM D–676–49T).—Degree of indentation produced by a plunger or indentor under a specific load. Measured with a Shore A Durometer. The values range from 0 to a maximum hardness of 100.

(B) Tensile strength (ASTM D–412–49T).—The force necessary to rupture a rubber specimen when stretched to the breaking point divided by the original cross sectional area (pounds per square inch).

(C) Elongation (ASTM D–412–51T).—Amount of stretch of a sample under a tensile force expressed as a percentage of the original length.

$$\frac{(\text{Stretched length minus original length}) \times 100}{\text{Original length}}$$

EXAMPLE 1

50 grams of a polymer of the formula:

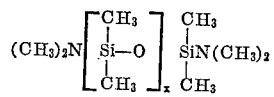

having a viscosity of 650 centistokes were mixed with 1 gram (equivalent to approximately 2 parts by weight per 100 parts by weight of the organopolysiloxamine) of

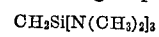

15 grams of the resulting mixture were poured into a petri dish and exposed to 50% relative humidity at 72° ±2° F. for a period of 72 hours. At the end of the 72 hour period, a gum-like polymeric product was obtained which was completely soluble in a n-hexane.

EXAMPLE 2

50 grams of a polymer of the formula:

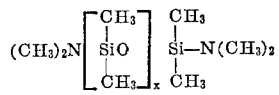

having a viscosity of 650 centistrokes were mixed with 1 gram (equivalent to approximately 2 parts by weight per 100 parts by weight of the organopolysiloxamine) of $CH_3Si[N(CH_3)_2]_3$. Three drops of glacial acetic acid (equivalent to approximately 0.36 part by weight per 100 parts by weight of the organopolysiloxamine) were added to 15 grams of this mixture, and the resulting liquid was poured into a petri dish and exposed to 50% relative humidity at 72° ±2° F. Within minutes a cross-linked elastomeric product was obtained which was insoluble in n-hexane.

EXAMPLE 3

100 grams of a fluid of the formula:

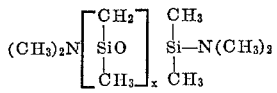

containing approximately 1.07% by weight of dimethylamino groups attached to silicon were mixed with 1 gram of $CH_3Si[N(CH_3)_2]_3$, 18 grams of diatomaceous earth (Celite), and 42 grams of ground quartz (Minusil). About 60 grams of this mixture were poured into a mold 6 inches by 6 inches by 5/64 of an inch, and 4 drops (equivalent to approximately 0.4 part by weight per 100 parts by weight of the organopolysiloxamine) of an organic acid (Sarcosyl LC) having the formula:

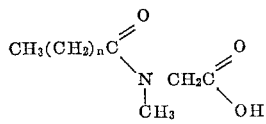

(wherein $n=12$ to 18) were added to the remainder of the mixture before pouring this material into a mold also. Both samples were then exposed to 50% relative humidity at 72° ±2° F. The first portion of the above-mentioned mixture, that portion which did not contain any acid, resulted in a filled gumstock after standing for two weeks. This composition appeared to have little of any cross-links and did not exhibit the properties of an elastomer. The second portion of the above-mentioned mixture, that portion which contained the acid catalyst, resulted in an elastomer having the following properties after 24 hours of exposure:

Hardness (Shore A) _____ 37
Tensile (p.s.i.) _____ 850
Elongation, percent _____ 315

EXAMPLE 4

100 grams of a polymer having the formula:

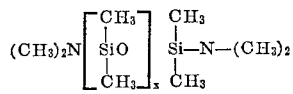

containing approximately 1.07% by weight of dimethylamino groups attached to silicon were mixed with 2 grams $CH_3Si[N(CH_3)_2]_3$, 10 drops (equivalent to approximately 0.6 part by weight per 100 parts by weight of the organopolysiloxamine) of 2-ethylhexanoic acid and 40 grams of finely divided polyvinylchloride in a dry nitrogen atmosphere. This composition was sealed in metal dispensing tubes and stored for a three month period. At the end of this storage period, a sample of the composition was exposed to an atmosphere of 50% relative humidity at room temperature; and, upon standing overnight in this atmosphere, the composition cured to a useful elastomer.

EXAMPLE 5

50 grams of a dimethylamino end-blocked dimethylpolysiloxane having a viscosity of 5600 centistokes were mixed with 14 grams of diatomaceous earth (Minusil 10W) (equivalent to 28 parts by weight per 100 parts by weight of organopolysiloxamine), and 2 grams of bis[tri (dimethylamino)silyl]ethane,

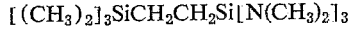

$[(CH_3)_2]_3SiCH_2CH_2Si[N(CH_3)_2]_3$ (equivalent to 4 parts by weight per 100 parts by weight of organopolysiloxamine) in a dry nitrogen atmosphere. 62 grams of the resulting mixture were then mixed with 2 drops of a carboxylic acid (Sarcosyl LC) of the formula:

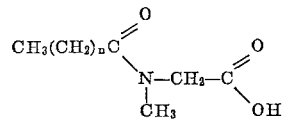

(wherein $n=12$ to 18) (equivalent approximately to 0.12 part by weight per 100 parts by weight of organopolysiloxamine). A portion of this composition was poured into an aluminum dish and exposed to atmospheric moisture. Within minutes, a cross-linked elastomer was formed which strongly adhered to the aluminum dish. The adhesion was such that it was impossible to remove the cured elastomer from the container without rupture of the rubber at the cured rubber-aluminum interface.

EXAMPLE 6

10 grams of a polymer of the formula:

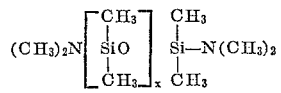

containing approximately 1.09% by weight of dimethylamino groups attached to silicon and having a viscosity of 580 centistokes were mixed with .14 gram of

$CH_3Si[N(CH_3)_2]_3$ (equivalent to 1.4 parts by weight per 100 parts by weight of organopolysiloxamine). The resulting mixture was divided into two equal portions, one of which was sealed, and one of which was exposed in a thin film to the atmosphere. There was no change in the sealed portion, whereas the exposed portion formed a soluble gum upon standing overnight.

EXAMPLE 7

10 grams of a polymer of the formula:

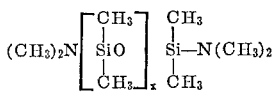

containing approximately 1.09% by weight of dimethylamino groups attached to silicon and having a viscosity of 580 centistokes were mixed with .05 gram of

$CH_3Si[N(CH_3)_2]_3$ (equivalent to .5 part by weight per 100 parts by weight of organopolysiloxamide) and .16 gram of diacetoxydimethylsilane (equivalent to 1.6 parts by weight per 100 parts by weight of organopolysiloxamide). The resulting mixture was divided into two equal portions, one of which was sealed, and one of which was exposed in a thin film to the atmosphere. There was no change in the sealed portion, whereas the exposed portion exhibited noticeable cross-linking within 5 minutes after being exposed.

EXAMPLE 8

100 grams of a polymer of the formula:

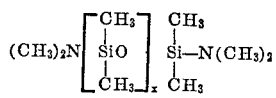

having a viscosity of 500 centistokes were mixed in a vertical Atlantic Research mixer with 1.5 grams of bis-[tri(dimethylamino)silyl]ethane, 0.1 gram of an organic acid (Sarcosyl LC) having the formula:

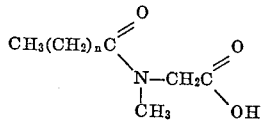

(wherein $n = 12$ to $18$) and 25 grams of a precipitated silica filler which had previously been treated with 15 parts by weight per 100 parts by weight of silica of a dimethyl-silicone oil (Quso M-50). Approximately 60 grams of this mixture were placed in a standard ASTM rubber testing slab and exposed to an atmosphere of 50% relative humidity at room temperature (72° F.). After fifteen minutes the sample was tack-free, and upon standing overnight in this atmosphere the composition cured to a useful elastomer exhibiting the following physical properties:

| | |
|---|---|
| Tensile strength (p.s.i.) | 600 |
| Elongation, percent | 250 |
| Hardness (Shore A) | 40 |

In order to test the bonding properties of the elastomer obtained from this mixture, portions of the mixture were placed on cloth, glass, steel, and stainless steel specimens and exposed overnight to an atmosphere of 50% relative humidity at 72° F. On the following day, the elastomer could not be removed from the cloth, glass and steel specimens without rupture of the rubber at the cured elastomer-specimen interface. Although the elastomer was removed from the stainless steel specimen without rupture of the elastomer, excellent adhesion also was observed and it was quite difficult to peel the elastomer off the surface of the specimen.

I claim:
1. A substantially anhydrous, acid-free mixture which comprises:
   (A) a major amount of an essentially linear organopolysiloxamine having the general formula:

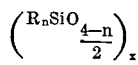

wherein R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $n$ has an average value of from about 1.8 to about 2.2, and $x$ has an average value of from 3 to 200, said organopolysiloxamine having an average of about two silicon-bonded amino end-blocking groups represented by the formula:

wherein R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^2$ is hydrogen, an unsubstituted monovalent hydrocarbon radical or a substituted monovalent hydrocarbon radical wherein the substiuents are selected from the class consisting of halogens, cyano groups, alkoxy groups, aryloxy groups, amino groups, carbalkoxy groups and nitro groups, or $R^1$ and $R^2$ together are a divalent hydrocarbon radical which forms a heterocyclic ring with the nitrogen atom to which said divalent hydrocarbon radical is attached; and
   (B) a minor amount of an organosilicon compound having at least one silicon atom and at least three of the silicon-bonded amino end-blocking groups defined above, each silicon atom present in said organosilicon compound being bonded to at least one of said silicon-bonded amino end-blocking groups, or to at least one other silicon atom through oxygen, the remaining valences of any silicon atoms present which are not satisfied by said silicon-bonded amino end-blocking group or oxygen to silicon bonds being satisfied by a unsubstituted hydrocarbon radical, a substituted hydrocarbon radical wherein the substituents are selected from the class consisting of halogens, cyano groups, alkoxy groups, aryloxy groups, amino groups, carbalkoxy groups and nitro groups, or a polyvalent hydrocarbon radical having each remaining free valence satisfied by a silicon atom which has its three remaining valences satisfied by unsubstituted monovalent hydrocarbon radicals, substituted monovalent hydrocarbon radicals wherein the substituents are selected from the class consisting of halogen, cyano groups, alkoxy groups, aryloxy groups, amino groups, carbalkoxy groups and nitro groups, silicon bonded amino end-blocking groups as defined above, or oxygen to silicon bonds.

2. A substantially anhydrous acid-free mixture as defined in claim 1 wherein organosilicon compound (B) is present in an amount ranging from about 0.1 part by weight to about 5 parts by weight per 100 parts by weight of the organopolysiloxamine and is selected from the class consisting of:
   (1) organosilylamines having the general formula:

wherein $R^1$ is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^2$ is hydrogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $a$ is 0 or 1, and X is a monovalent hydrocarbon radical, a substituted monovalent hydrocarbon radical wherein the substituents are selected from the class consisting of halogens, cyano groups, alkoxy groups, aryloxy groups, amino groups, carbalkoxy groups and nitro groups, a group having the formula:

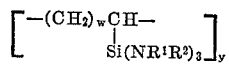

wherein $w$ is an integer having a value of from 1 to about 10, $y$ is an integer having a value of from 1 to about 1000, and $R^1$ and $R^2$ are as hereinbefore defined, or a group having the formula:

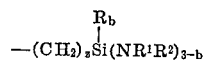

R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^1$ and $R^2$ are as hereinbefore defined, $z$ is an integer having a value of from 1 to 10 and $b$ is 0, 1 or 2;
   (2) aminosiloxanes containing at least three silicon-bonded end-blocking groups represented by the formula

wherein $R^1$ and $R^2$ are as hereinbefore defined and consisting essentially of units having the general formula:

$$Z_p Si(NR^1R^2)_q O_{\frac{4-(p+q)}{2}} \quad (I)$$

wherein $R^1$ and $R^2$ are as hereinbefore defined, $p$ is 0, 1, 2 or 3, $q$ is 0, 1, 2 or 3, the sum of $p+q$ is never greater than 3, and Z is a group selected from the class consisting of R, $$\left[ -(CH_2)_x\underset{\underset{Si(NR^1R^2)_3}{|}}{CH-} \right]_y$$

or $$-(CH_2)_x\underset{\underset{}{|}}{\overset{R_c}{Si}}(NR^1R^2)_dO_{\frac{3-(c+d)}{2}}$$

wherein R, $R^1$, $R^2$, $x$ and $y$ are as hereinbefore defined, $c$ is 0, 1, 2 or 3, $d$ is 0, 1, 2, or 3 and the sum of $c+d$ is never greater than 3; and (3) aminosiloxanes containing at least three of the silicon-bonded amino end-blocking groups defined above which consist essentially of units of Formula I and units of the formula:

$$R_e SiO_{\frac{4-e}{2}}$$

wherein R is as hereinbefore defined and $e$ is 0, 1, 2 or 3.

3. A substantially anhydrous acid-free mixture as defined in claim 2 wherein the organopolysiloxane (A) is a dimethylamino end-blocked dimethylsiloxane and the organosilicon compound (B) is selected from the class consisting of $CH_3Si[N(CH_3)_2]_3$;

$$\left( [(CH_2)_2N]_2Si\underset{\underset{CH_3}{|}}{-}\hspace{-1pt}-O \right)_3$$

and $[(CH_3)_2N]_3SiCH_2CH_2Si[N(CH_3)_2]_3$.

4. A process for preparing an essentially linear, high molecular weight organopolysiloxane gum which comprises reacting (1) a major amount of an essentially linear organopolysiloxamine as defined in claim 1, (2) a minor amount of an organosilicon compound as defined in claim 1 and (3) water in an amount sufficient to form said organopolysiloxane gum.

5. An essentially linear, high molecular weight organopolysiloxane gum prepared according to the process claimed in claim 4.

6. A substantially anhydrous mixture which comprises: (A) a major amount of an essentially linear organopolysiloxamine as defined in claim 1, (B) a minor amount of an organosilicon compound as defined in claim 1, and (C) an acid catalyst.

7. A substantially anhydrous mixture as claimed in claim 6 wherein the organosilicon compound (B) is present in an amount ranging from about 0.1 part by weight to about 5 parts by weight per 100 parts by weight of the organopolysiloxamine and is selected from the class consisting of:

(1) organosilylamines having the general formula:

$$X_a Si(NR^1R^2)_{4-a}$$

wherein $R^1$ is an unsubstituted monovalent hydrocarbon radical or a substituted monovalent hydrocarbon radical wherein the substituents are selected from the class consisting of halogen, cyano groups, alkoxy groups, aryloxy groups, amino groups, carbalkoxy groups and nitro groups, $R^2$ is hydrogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $a$ is 0 or 1, and X is a monovalent hydrocarbon radical, a substituted monovalent hydrocarbon radical wherein the substituents are selected from the class consisting of halogens, cyano groups, alkoxy groups, aryloxy groups, amino groups, carbalkoxy groups and nitro groups, a group having the formula:

$$\left[ -(CH_2)_w\underset{\underset{Si(NR^1R^2)_3}{|}}{CH-} \right]_y$$

wherein $w$ is an integer having a value of from 1 to about 10, $y$ is an integer having a value of from 1 to about 1000, and $R^1$ and $R^2$ are as hereinbefore defined, or a group having the formula:

$$-(CH_2)_z\underset{\underset{}{|}}{\overset{R_b}{Si}}(NR^1R^2)_{3-b}$$

R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^1$ and $R^2$ are as hereinbefore defined, $z$ is an integer having a value of from 1 to 10 and $b$ is 0, 1 or 2;

(2) aminosiloxanes containing at least three silicon-bonded end-blocking groups represented by the formula

wherein $R^1$ and $R^2$ are as hereinbefore defined and consisting essentially of units having the general formula:

$$Z_p Si(NR^1R^2)_q O_{\frac{4-(p+q)}{3}} \quad (I)$$

wherein $R^1$ and $R^2$ are as hereinbefore defined, $p$ is 0, 1, 2 or 3, $q$ is 0, 1, 2 or 3, the sum of $p+q$ is never greater than 3, and Z is a group selected from the class consisting of R, $$\left[ -(CH_2)_x\underset{\underset{Si(NR^1R^2)_3}{|}}{CH-} \right]_y$$

or $$-(CH_2)_x\underset{\underset{}{|}}{\overset{R_c}{Si}}(NR^1R^2)_dO_{\frac{3-(c+d)}{2}}$$

wherein R, $R^1$, $R^2$, $x$ and $y$ are as hereinbefore defined, $c$ is 0, 1, 2 or 3, $d$ is 0, 1, 2 or 3 and the sum of $c+d$ is never greater than 3; and (3) aminosiloxanes containing at least three of the silicon-bonded amino end-blocking groups defined above which consist essentially of units of Formula I and units of the formula:

$$R_e SiO_{\frac{4-e}{2}}$$

wherein R is as hereinafter defined and $e$ is 0, 1, 2 or 3; and the acid catalyst (C) is present in an amount ranging from about 0.01 part by weight to about 2.0 parts by weight per 100 parts by weight of the organopolysiloxamine and is selected from the class consisting of:

(a) Bronsted-Lowry acids,
(b) Lewis acids, (c) compounds which decompose or dissociate to generate a Bronsted-Lowry acid; and
(d) compounds which decompose or dissociate to generate a Lewis acid.

8. A substantially anhydrous mixture as claimed in claim 7 wherein the organopolysiloxamine (A) is a dimethylamino end-blocked dimethylsiloxane, the organosilicon compound (B) is selected from the class consisting of $CH_3Si[N(CH_3)_2]_3$;

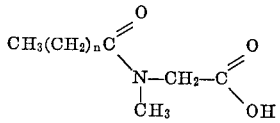

and $[(CH_3)_2N]_3SiCH_2CH_2Si[N(CH_3)_2]_3$; and the acid catalyst (C) is selected from the class consisting of acetic acid, 2-ethylhexanoic acid, and acid having the formula:

wherein $n$ is an integer having a value of from 12 to 18, and diacetoxydimethylsilane.

9. A substantially anhydrous mixture as claimed in claim 8 which comprises as an additional component a filler material selected from the class consisting of silica, polyvinylchloride, and a mixture of diatomaceous earth and ground quartz.

10. A substantially anhydrous mixture which comprises: (A) an essentially linear, high molecular weight organopolysiloxane gum reaction product of a major amount of an essentially linear organopolysiloxamine as defined in claim 1, a minor amount of an organosilicon compound as defined in claim 1 and water in an amount sufficient to form said organopolysiloxane gum reaction product; and (B) a minor amount of an acid catalyst.

11. A substantially anhydrous mixture which comprises:
(A) an essentially linear, high molecular weight organopolysiloxane gum reaction product of (1) an essentially linear organpolysiloxamine as defined in claim 1, (2) from about 0.1 part by weight to about 5 parts by weight per 100 parts by weight of the organopolysiloxamine of an organosilicon compound selected from the class consisting of:
(a) organosilylamines having the general formula:

$$X_aSi(NR^1R^2)_{4-a}$$

wherein $R^1$ is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^2$ is hydrogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $a$ is 0 or 1, and X is a monovalent hydrocarbon radical, a substituted monovalent hydrocarbon radical wherein the substituents are selected from the class consisting of halogens, cyano groups, alkoxy groups, aryloxy groups, amino groups, carbalkoxy groups and nitro groups, a group having the formula:

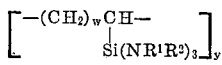

wherein $w$ is an integer having a value of from 1 to about 10, $y$ is an integer having a value of from 1 to about 1000, and $R^1$ and $R^2$ are as hereinbefore defined, or a group having the formula:

R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^1$ and $R^2$ are as hereinbefore defined, $z$ is an integer having a value of from 1 to 10, $b$ is 0, 1 or 2;
(b) aminosiloxanes containing at least three silicon-bonded end-blocking groups represented by the formula

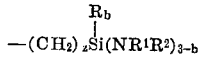

wherein $R^1$ and $R^2$ are as hereinbefore defined and consisting essentially of units having the general formula:

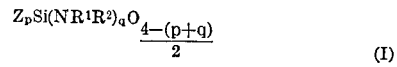

wherein $R^1$ and $R^2$ are as hereinbefore defined, $p$ is 0, 1, 2 or 3, $q$ is 0, 1, 2 or 3, the sum of $p+q$ is never greater than 3, and Z is a group selected from the class consisting of R,

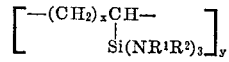

or

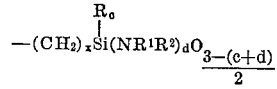

wherein $R$, $R^1$, $R^2$, $x$ and $y$ are as hereinbefore defined, $c$ is 0, 1, 2 or 3, $d$ is 0, 1, 2 or 3 and the sum of $c+d$ is never greater than 3; and
(c) aminosiloxanes containing at least three of the silicon-bonded amino end-blocking groups defined above which consists essentially of units of Formula I and units of the formula:

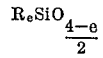

wherein R is as hereinbefore defined and $e$ is 0, 1, 2 or 3; and (3) water in an amount sufficient to form said organopolysiloxane gum reaction product; and (B) from 0.01 part by weight to about 2.0 parts by weight per 100 parts by weight of the organopolysiloxamine used in preparing the organopolysiloxane gum reaction product (A) of an acid catalyst selected from the class consisting of:
(a) Bronsted-Lowry acids,
(b) Lewis acids,
(c) compounds which decompose or dissociate to generate a Bronsted-Lowry acid; and
(d) compounds which decompose or dissociate to generate a Lewis acid.

12. A process for preparing a cured organopolysiloxane elastomer which comprises reacting in the presence of an acid catalyst (A) a major amount of an essentially linear organopolysiloxamine as defined in claim 1, (B) a minor amount of an organosilicon compound as defined in claim 1; and (C) water in an amount sufficient to form said elastomer.

13. A process for preparing a cured organopolysiloxane elastomer which comprises further reacting in the presence of an acid catalyst (A) an essentially linear, high molecular weight organopolysiloxane gum reaction product of (1) an essentially linear organopolysiloxamine as defined in claim 1, (2) from 0.1 part by weight to about 5 parts by weight per 100 parts by weight of the organopolysiloxamine of an organosilicon compound selected from the class consisting of:

(a) organosilylamines having the general formula:

$$X_a Si(NR^1R^2)_{4-a}$$

wherein $R^1$ is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^2$ is hydrogen, an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $a$ is 0 or 1, and X is a monovalent hydrocarbon radical, a substituted monovalent hydrocarbon radical wherein the substituents are selected from the class consisting of halogens, cyano groups, alkoxy groups, aryloxy groups, amino groups, carbalkoxy groups and nitro groups, a group having the formula:

$$\left[ \begin{array}{c} -(CH_2)_w CH- \\ | \\ Si(NR^1R^2)_3 \end{array} \right]_y$$

wherein $w$ is an integer having a value of from 1 to about 10, $y$ is an integer having a value of from 1 to about 1000, and $R^1$ and $R^2$ are as hereinbefore defined, or a group having the formula:

$$-(CH_2)_z \underset{\underset{R_b}{|}}{Si}(NR^1R^2)_{3-b}$$

R is an unsubstituted monovalent hydrocarbon radical or a substituted monovalent hydrocarbon radical wherein the substituents are selected from the class consisting of halogens, cyano groups, alkoxy groups, aryloxy groups, amino groups, carbalkoxy groups and nitro groups, $R^1$ and $R^2$ are as hereinbefore defined, $z$ is an integer having a value of from 1 to 10 and $b$ is 0, 1 or 2;

(b) aminosiloxanes containing at least three silicon-bonded end-blocking groups represented by the formula $$\underset{R^2}{\overset{R^1}{\diagdown}} N-$$

wherein $R^1$ and $R^2$ are as hereinbefore defined and consisting essentially of units having the general formula:

$$Z_p Si(NR^1R^2)_q O_{\frac{4-(p+q)}{2}} \qquad (I)$$

wherein $R^1$ and $R^2$ are as hereinbefore defined, $p$ is 0, 1, 2 or 3, $q$ is 0, 1, 2 or 3, the sum of $p+q$ is never greater than 3, and Z is a group selected from the class consisting of R, $$\left[ \begin{array}{c} -(CH_2)_x CH- \\ | \\ Si(NR^1R^2)_3 \end{array} \right]_y$$

or $$-(CH_2)_x \underset{\underset{R_c}{|}}{Si}(NR^1R^2)_d O_{\frac{3-(c+d)}{2}}$$

wherein R, $R^1$, $R^2$, $x$ and $y$ are as hereinbefore defined, $c$ is 0, 1, 2 or 3, $d$ is 0, 1, 2 or 3 and the sum of $c+d$ is never greater than 3; and (c) aminosiloxanes containing at least three of the silicon-bonded amino end-blocking groups defined above which consist essentially of units of Formula I and units of the formula:

$$R_e SiO_{\frac{4-e}{2}}$$

wherein R is as hereinbefore defined and $e$ is 0, 1, 2 or 3; and (3) water in an amount sufficient to form said organopolysiloxane gum reaction product, with (B) water in an amount sufficient to form said organopolysiloxane elastomer.

14. A cured silicone elastomer reaction product of a mixture as defined in claim 6 and water.

15. A cured silicone elastomer reaction product of a mixture as defined in claim 7 and water.

16. A cured silicone elastomer reaction product of a mixture as defined in claim 8 and water.

17. A cured silicone elastomer reaction product of a mixture as defined in claim 9 and water.

18. A cured silicone elastomer reaction product of a mixture as defined in claim 10 and water.

19. A cured silicone elastomer reaction product of a mixture as defined in claim 11 and water.

20. The process of claim 12 wherein the organosilicon compound defined in part (B) of claim 12 is an organosilylamine having the general formula:

$$X_a Si(NR^1R^2)_{4-a}$$

wherein $R^1$ and $R^2$ are unsubstituted monovalent hydrocarbon radicals, $a$ is 1 and X is a monovalent hydrocarbon radical or a group having the formula:

$$-(CH_2)_z \underset{\underset{R_b}{|}}{Si}(NR^1R^2)_{3-b}$$

wherein R is an unsubstituted monovalent hydrocarbon radical, $R^1$ and $R^2$ are as hereinbefore defined, $z$ is an integer having a value of from 1 to 10 inclusive and $b$ is 0, 1 or 2.

References Cited

UNITED STATES PATENTS

| | | | |
|---|---|---|---|
| 3,359,237 | 12/1967 | Boissieras et al. | 260—37 |
| 3,291,772 | 12/1966 | Boot et al. | 260—46.5 |
| 3,032,528 | 5/1962 | Nitzsche et al. | |
| 2,676,163 | 4/1954 | Speier | 260—46.5 |
| 2,503,919 | 4/1950 | Patnode | 260—46.5 |

OTHER REFERENCES

U. Bazant and V. Chavlosky, "Chemistry of Organosilicon Compounds," Academic Press, New York, 1965, pp. 76, 77, 85, 86.

MORRIS LIEBMAN, *Primary Examiner.*

L. T. JACOBS, *Assistant Examiner.*

U.S. Cl. X.R.

260—46.5

UNITED STATES PATENT OFFICE
CERTIFICATE OF CORRECTION

Patent No. 3,451,964   June 24, 1969

Charles E. Creamer

It is certified that error appears in the above identified patent and that said Letters Patent are hereby corrected as shown below:

Column 4, line 75, after "as" insert -- a --. Column 5, line 24, "acycloxy" should read -- acyloxy --. Column 6, lines 59 to 61, that portion of the formula reading "$R^3$" should read -- $R^2$ --. Column 10, line 72, that portion of the formula reading "$CH_2$" should read -- $CH_3$ --. Column 12, lines 68 and 70, "organopolysiloxamide", each occurrence, should read -- organopolysiloxamine --. Column 13, line 65, "R" should read -- $R^1$ --. Column 15, lines 42 to 44, that portion of the formula reading "($CH_2$)" should read -- ($CH_3$) --. Column 20, line 8, that portion of the formula reading "Ro" should read -- Re --.

Signed and sealed this 31st day of March 1970.

(SEAL)

Attest:

Edward M. Fletcher, Jr.

Attesting Officer

WILLIAM E. SCHUYLER, JR.

Commissioner of Patents